Patented Aug. 19, 1930

1,773,517

UNITED STATES PATENT OFFICE

EDWIN E. CLAYTOR, OF TULSA, OKLAHOMA, ASSIGNOR TO PETROLEUM CHEMICAL COMPANY, OF TULSA, OKLAHOMA, A CORPORATION OF OKLAHOMA

PROCESS FOR BREAKING PETROLEUM EMULSIONS

No Drawing. Application filed December 31, 1928. Serial No. 329,676.

This invention relates to the treatment of emulsions of mineral oil and water, such as petroleum emulsions, for the purpose of separating the oil from the water.

Petroleum emulsions are of the water-in-oil type and comprise fine droplets of naturally occurring water or brines, dispersed in a more or less permanent state throughout the oil which constitutes the continuous phase of the emulsion. They are obtained from producing wells and from the bottoms of oil storage tanks and are commonly referred to as "cut oil," "roily oil," "emulsified oil" and "bottom settlings."

The object of my present invention is to provide a novel and inexpensive process for separating emulsions of the character referred to into their component parts of oil and water or brine.

Briefly described, my process consists in subjecting a petroleum emulsion to the action of a demulsifying agent consisting of a mixture comprising a condensation product derived from the reaction between a non-hydroxy aromatic hydrocarbon, formaldehyde and sulphuric acid combined with a sulphonated fatty body, so as to cause the emulsion to break and separate into its component parts of oil and water or brine when the emulsion is permitted to remain in a quiescent state after treatment.

In producing the demulsifying agent contemplated by my process, the non-hydroxy aromatic hydrocarbon that is used may be benzene, toluene, xylene, naphthalene, etc., or a mixture of two or more of them. The detergent-forming acid that is used may be any suitable organic fatty body such as oleic acid, ricin-oleic acid, etc., or a mixture of two or more of them that possess the property of combining with alkali to produce a soap or soap-like detergent. One procedure that can be used to produce the demulsifying agent contemplated by my process is as follows: 150 parts, by weight, of naphthalene are sulphonated with 800 parts, by weight, of 66 degree Baumé sulphuric acid, and subsequently 50 parts, by weight, of a 35 per cent aqueous solution of formaldehyde are added a little at a time with heating at 80° to 90° C. for a few minutes. Methylal may be used in lieu of formaldehyde. This procedure produces what may be termed a soft synthetic resin, inasmuch as it is the initial step toward the production of a hard resin insoluble in water. In producing the soft resin suitable for use in my present process, it is desirable not to extend the time of heating beyond a few minutes, nor use excessive quantities of formaldehyde, for this will produce a water insoluble resin, whereas it is desired to produce a soft resin entirely soluble in water. The next step in the production of the demulsifying agent is the mixing of from 10 per cent to as high as 60 per cent, and preferably 35 per cent, of the soft resin just described with the selected fatty body which has been previously sulphonated with sulphuric acid, varying from 10 per cent to 50 per cent, and preferably 35 per cent, by weights and subsequently washing the same to remove most of the excess sulphuric acid. The mixing of the soft resin with the sulphonated fatty body may be conducted at normal atmospheric temperature, but it may be found advantageous to heat the mass to approximately from 25° to 35° C. to reduce the time required to produce a complete and uniform mixture. The acid mass resulting from the mixing of the soft resin with the sulphonated fatty body may be used as such for it is an active demulsifying agent, but due to the corrosive properties of the sulphonic acids, I prefer to use the water-soluble salts obtained by neutralization of the acidic material by means of caustic soda, potash or ammonia. In either case, the final product is a colloidal composition wherein the condensation product appears to be carried in colloidal condition or as a colloidal suspension in the detergent material.

The quantity of water incorporated with the demulsifying agent just described seems to be of great importance, the optimum quantity being that sufficient to just clear the solution. This water may be mixed with the alkaline neutralizing salt or it may be incorporated after neutralization; the quantity varying from 10 per cent to as high as 50 per cent of the finished product.

The principal advantage gained in producing a demulsifying agent of the kind just described is a substantial reduction in the cost of manufacture due to the low cost of the materials used in producing the soft resin and to the fact that considerable water can be incorporated therewith. I attribute this desirable result to the colloidality of this new demulsifying agent, which colloidality is due to the peculiar properties of the soft naphthalene-formaldehyde-sulphuric acid resin, for it is now well recognized that only colloids segregate at the interfaces of petroleum emulsions and that the agent used to treat the emulsion must segregate itself at the interfaces.

In practicing my process the treating agent, consisting of a substance of the character above described, is brought into contact with an emulsion, either by introducing the treating agent into a well in which a petroleum emulsion is being produced; introducing the treating agent into a conduit through which a petroleum emulsion is flowing; introducing the treating agent into a tank in which a petroleum emulsion is stored, or introducing the treating agent into a container that holds the sludge obtained from the bottom of an oil storage tank. The treating agent can even be introduced into a producing well in such a way that it will become mixed with water or oil that is emerging from the ground before said water and oil enter the barrel of the well pump of the tubing up through which said water and oil flow to the surface of the ground. The amount of treating agent to be used in the resolving of emulsions will vary according to the nature of the emulsion under treatment, as will be apparent. However, it has been found that best results are ordinarily obtained by employing approximately one gallon of the demulsifying agent for every one hundred barrels of oil treated. After any of the various treatments above referred to the emulsion is allowed to stand in a quiescent state at a suitable temperature, so as to permit the water or brine to separate from the oil, or it may be passed through a variety of apparatus, such as hay tanks, gun barrels, etc., such as are now commonly used for "breaking" petroleum emulsions. It may even be passed through a heating apparatus, a centrifugal or electrical dehydrator, or an emulsifying device, with or without the addition of water to the emulsion, or it may be subjected to action by a combination of two or more of the devices above referred to.

The term "saturated series aldehyde compound" as used in the claims is intended to cover both formaldehyde and methylal. While the latter compound which is an ether of methylene glycol, is not, strictly speaking, an aldehyde of the saturated series in the sense that formaldehyde is, it is commonly classified under the broad heading of aldehydes of the saturated series and is so considered herein for the purpose of generic terminology.

Having thus described my invention, what I claim as new and desire to protect by Letters Patent is:

1. A process of breaking or separating petroleum emulsions which comprises subjecting the emulsion to the action of a demulsifying agent comprising a water soluble product derived from the reaction between a non-hydroxy aromatic hydrocarbon, a saturated series of aldehdye compound and sulphuric acid, intimately associated with a sulphonated fatty body.

2. A process of breaking or separating petroleum emulsions which comprises subjecting the emulsion to the action of a demulsifying agent comprising a water soluble product derived from the reaction for a few minutes at a temperature of approximately from 80° to 90° C. between a non-hydroxy aromatic hydrocarbon, a saturated series aldehyde compound and sulphuric acid, intimately associated in the presence of water with a sulphonated fatty body.

3. A process of breaking or separating petroleum emulsions which comprises subjecting the emulsion to the action of a demulsifying agent comprising a water soluble product derived from the reaction between a non-hydroxy aromatic hydrocarbon, formaldehyde and sulphuric acid, intimately associated with a sulphonated fatty body.

4. A process of breaking or separating petroleum emulsions which comprises subjecting the emulsion to the action of a demulsifying agent comprising a water soluble product derived from an incomplete reaction between naphthalene, a saturated series aldehyde compound and sulphuric acid, intimately associated with a sulphonated fatty acid.

5. A process of breaking or separating petroleum emulsions which comprises subjecting the emulsion to the action of a demulsifying agent comprising a water soluble product derived from an incomplete reaction between naphthalene, formaldehyde and sulphuric acid, intimately associated with a sulphonated fatty acid.

6. A process of breaking or separating petroleum emulsions which comprises subjecting the emulsion to the action of a demulsifying agent comprising a water soluble product derived from the reaction for a few minutes at a temperature at approximately from 80° to 90° C. between a non-hydroxy aromatic hydrocarbon, formaldehyde and sulphuric acid, intimately associated in the presence of water with a sulphonated body.

7. A process of breaking or separating petroleum emulsions which comprises subjecting the emulsion to the action of a demulsifying agent comprising a water soluble product derived from the reaction for a few minutes at a temperature of approximately from 80° to 90° C. between naphthalene, a saturated series aldehyde compound and sulphuric acid, intimately associated in the presence of water with a sulphonated fatty body.

8. A process of breaking or separating petroleum emulsions which comprises subjecting the emulsion to the action of a demulsifying agent comprising a water soluble product derived from the reaction for a few minutes at a temperature of approximately from 80° to 90° C. between naphthalene, formaldehyde and sulphuric acid intimately associated in the presence of water with a sulphonated fatty acid.

9. A process of breaking or separating petroleum emulsions which comprises subjecting the emulsion to the action of a demulsifying agent comprising a water soluble salt of the product derived from the reaction between a non-hydroxy aromatic hydrocarbon, a saturated series aldehyde compound and sulphuric acid, intimately associated with a sulphonated fatty body.

10. A process of breaking or separating petroleum emulsions which comprises subjecting the emulsion to the action of a demulsifying agent comprising a water soluble salt of the product derived from the reaction for a few minutes at a temperature of approximately from 80° to 90° C. between a non-hydroxy aromatic hydrocarbon, a saturated series aldehyde compound and sulphuric acid, intimately associated in the presence of water with a sulphonated fatty acid.

In testimony whereof, I have signed my name to this specification this 29th day of December, 1928.

EDWIN E. CLAYTOR.